United States Patent
Brownell

[15] 3,640,396
[45] Feb. 8, 1972

[54] FILTER

[72] Inventor: Peter Brownell, Providence, R.I.
[73] Assignee: Fram Corporation, Providence, R.I.
[22] Filed: Apr. 3, 1970
[21] Appl. No.: 25,470

[52] U.S. Cl. ...........................210/493, 156/227, 210/497
[51] Int. Cl. .........................................................B01d 27/06
[58] Field of Search ....................210/493, 506; 55/337, 511, 55/521, 500, 498, 497, 499, 502; 156/227

[56] References Cited

UNITED STATES PATENTS

| | | | |
|---|---|---|---|
| 3,042,571 | 7/1962 | Jackson | 210/493 X |
| 3,401,803 | 9/1968 | Bub | 210/493 X |
| 2,732,031 | 1/1956 | Rabbitt et al. | 210/493 X |
| 2,537,992 | 1/1951 | Gross et al. | 210/493 |

FOREIGN PATENTS OR APPLICATIONS

| | | | |
|---|---|---|---|
| 795,282 | 3/1936 | France | 55/521 |

*Primary Examiner*—Reuben Friedman
*Assistant Examiner*—Frederick F. Calvetti
*Attorney*—Robert E. Hillman

[57] ABSTRACT

A fluid filter comprising a pleated filtering medium arranged in an annulus and having axial main pleats (defined by radial score lines), oblique secondary pleats (defined by "sawtooth" score lines) at the radial peripheries of the annulus, and seals around the peripheries which overlap at least a portion of the oblique pleats; the filter tapering at the oblique pleats to an axial dimension less than a corresponding axial dimension of the main pleats.

1 Claims, 7 Drawing Figures

FILTER

This invention relates to fluid filters.

It is an object of the invention to provide low-profile fluid filters (e.g., suitable for mounting in an automobile under a low hood) which are of efficient construction (e.g., there is minimal blocking of filter medium by overlying layers of medium). Further objects include the provision of such filters which are inexpensive, easy to manufacture (e.g., conventional pleaters being easily adapted), and reliable (e.g., pleats remain secured under all operating conditions).

According to one aspect of the invention there is provided a fluid filter comprising a pleated filtering medium arranged in an annulus and having axial main pleats defined by radial fold lines, and oblique secondary pleats at a radial periphery of the annulus, the filter tapering at the oblique pleats to an axial dimension less than a corresponding axial dimension of the main pleats. In preferred embodiments of this aspect of the invention, the filtering medium has oblique pleats at both radial peripheries of the annulus, the radial fold lines are scored and the oblique pleats are defined in part by oblique score lines, and seals are provided around each radial periphery. In other preferred embodiments of this aspect of the invention each oblique score line extends between a point on a radial score line of an axial main pleat spaced inward of the periphery and a point on the periphery intermediate the score line of that main pleat and the score line of an adjacent main pleat, adjacent oblique score lines intersecting in an angle of 60°; each main pleat comprises a pair of stretches of the medium, and each oblique pleat comprises first portions of the pair of stretches and a triangular flap comprising second portions of the pair of stretches, the oblique score lines being respectively between those first and second portions, each stretch having two oblique score lines; and the flaps of the oblique pleats are all bent in the same direction about the periphery in a nested configuration. In still other preferred embodiments of this aspect of the invention each main pleat comprises a pair of stretches of the medium, and each oblique pleat comprises first and second portions of one stretch of the pair, the oblique score lines being respectively between those first and second portions; each oblique score line extends between a point on a score line of an axial main pleat spaced inward of the periphery and the intersection of a score line of an adjacent axial main pleat and the periphery, adjacent oblique score lines intersecting in an angle of 90°; and each of the two stretches of each open-downward main pleat has an oblique pleat, a portion of the radial score line separating those two stretches defining a common border of the first portions of those oblique pleats.

According to another aspect of the invention, there is provided a method of producing an improved filter element which comprises the steps of scoring filter paper with both main, transverse, parallel score lines extending across the filter paper and secondary oblique score lines at an edge of the paper; gathering the paper into pleats along the transverse score lines and along the oblique score lines; forming the pleated paper into an annulus with oblique pleats at a radial periphery; placing the paper in this configuration into a mold and clamping the periphery therein; disposing an elastomer so as to form a seal which partially overlaps the periphery, and curing the elastomer. In a preferred embodiment of this aspect of the invention, the paper is impregnated with a resin and the elastomer and the resin are cured simultaneously.

Other objects, features, and advantages will appear from the following description of a preferred embodiment, taken together with the attached drawings thereof, in which.

Figure 1:
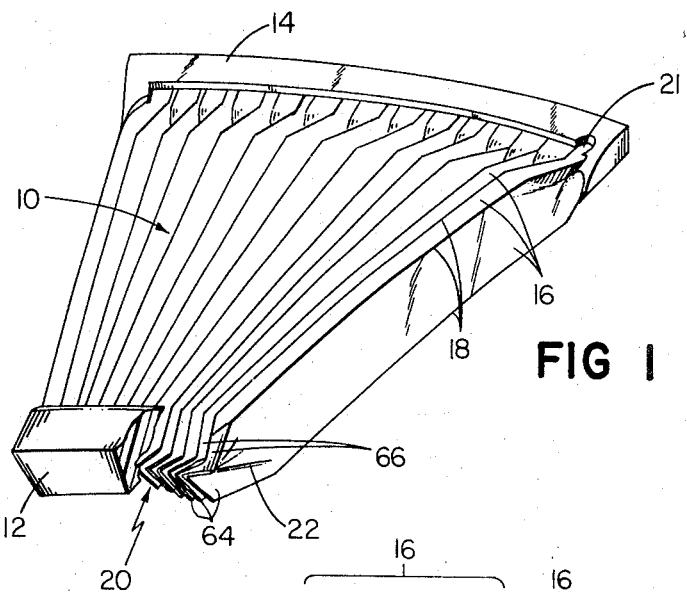
FIG. 1 is a partially broken away perspective view of a portion of a filter element constructed according to the invention.

In FIG. 1 there is shown a fragment of an annular filter element 10 of a conventional resin-impregnated paper having elastomeric seals 12 and 14 around its inner and outer circumferential portions 20, 21. The paper 10 has a series of axial main pleats 16 defined by a series of radial score lines 18. The filter element 10 is tapered to a smaller axial thickness in the vicinity of its inner and outer circumferential portions 20, 21.

Figure 2:
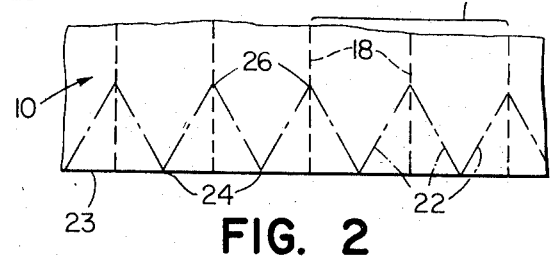
FIG. 2 is a plan view of a portion of a sheet of filter paper which illustrates the score lines required to produce the configuration illustrated in FIG. 1.

FIG. 2 illustrates the pattern of score lines on a plane sheet of filter paper which produces the configuration illustrated in FIG. 1. The score lines consist of a series of parallel score lines 18 which extend across the entire width of the filter paper and a series of oblique score lines 22 in the vicinity of each paper edge 23. Each of these oblique score lines 22 extends between a point 24 on the edge 23 midway between two adjacent score lines 18 and a point 26 on an adjacent score line 18 spaced inwardly of the paper edge 23. Each oblique score line 22 forms an angle of 60° with the adjacent score lines 22 at the points of intersection.

Figure 2A:
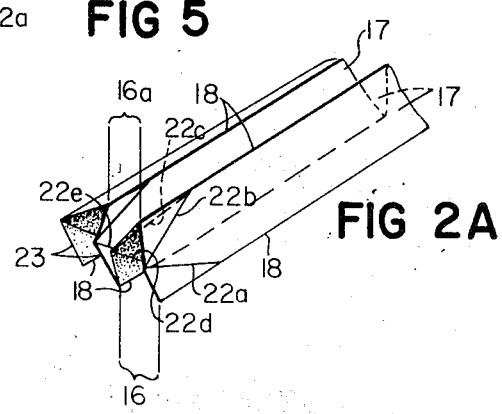
FIG. 2A is a perspective view of a partially folded filter element having score liens as shown in FIG. 2.

As shown in FIG. 2A, each main pleat, whether upward-pointing (pleat 16) or downward-pointing (pleat 16a), comprises a pair of stretches 17. Referring to pleat 16, oblique score lines 22b, 22c each with edge 23 and a single main score line 18 to define a pair of triangular portions of the two stretches 17 of pleat 16. These triangular portions (in contact when the main pleats are snugly gathered) comprise a flap of the oblique pleat associated with the pleat 16. The remainder of this oblique pleat consists of other portions of the two stretches 17. These latter portions are the areas of the pair of stretches which are overlain by the flap when the stretches are in contact and the flap is fully bent over along score lines 22b, 22c.

In an analogous fashion, score lines 22d, 22e serve to define the flap of the oblique pleat associated with main pleat 16a.

Figure 3:
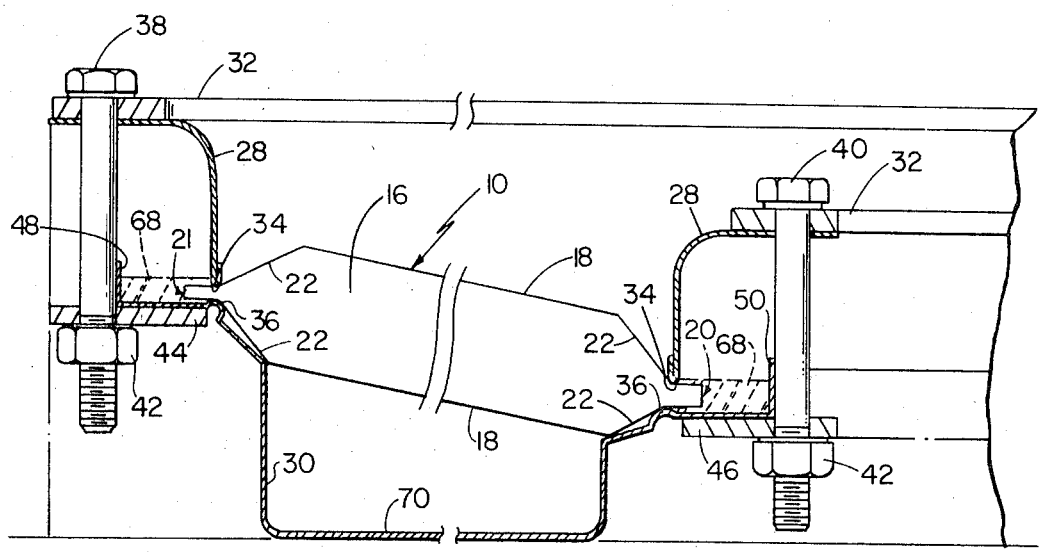
FIG. 3 is a somewhat diagrammatical, partially broken away side elevation of a paper filter medium retained in a mold.

FIG. 3 illustrates a molding device for forming the rims 12 and 14 upon the filter paper 10. Top and bottom compressing elements 28 and 30, respectively, are mounted within a frame member 32 with bearing portions 34 and 36 in vertical alignment. A first series of bolts 38 is supported by the frame member 32 in a circular pattern about the periphery of the mold. The bolts 40 of a second series are supported by another portion of the frame member 32 in a concentric pattern within the pattern formed by the bolts 38 of the first series. Nuts 42 are threaded about bolts 38 and 40 and are welded to ring members 44 and 46. Ring members 44 and 46 support outer and inner extensions 48 and 50, respectively, of the bottom compressing element 30.

Figure 4:
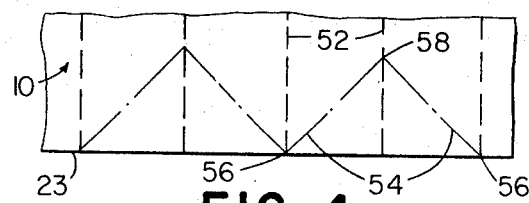
FIG. 4 is a view analogous to that of FIG. 2 illustrating an alternative pattern of score lines for the production of a filter element according to the invention.
Figure 5:
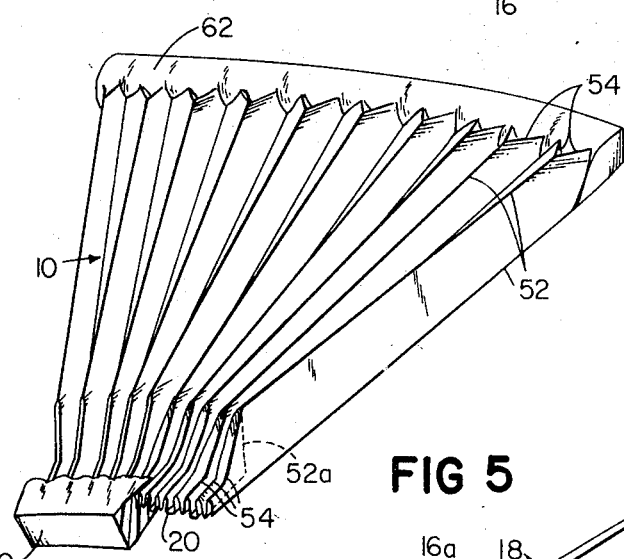
FIG. 5 is a partially broken away perspective view of a portion of a filter element which employs the score line pattern illustrated in FIG. 4.

In the alternative embodiment illustrated in FIGS. 4 and 5, the filter paper 10 is again provided with transverse parallel score lines 52 and with a series of oblique score lines 54 in the vicinity of the paper edge 23. The oblique score lines 54 extend between the point 56 where a score line 52 and the edge 23 intersect and a point 58 on an adjacent score line 52 which is spaced inwardly of the paper edge 23. The oblique score lines 54 intersect in angles of 90°. Inner and outer seals 60, 62 are again provided and the filter element 10 is tapered in the vicinity of each seal.

Figure 4A:
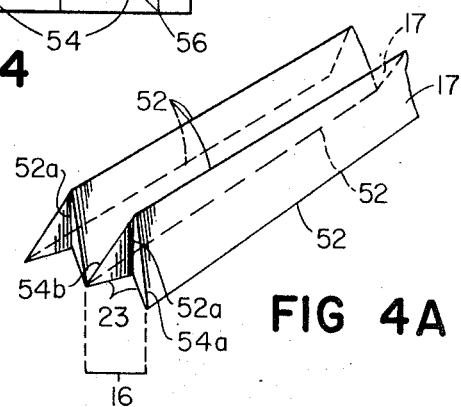
FIG. 4A is a perspective view of a partially folded filter element having score lines as shown in FIG. 4.

Referring to FIG. 4A, each open-downward main pleat 16 comprises a pair of stretches 17 of the filter paper. Oblique score lines 54a, 54b cooperate with edge 23 and an end portion 52a of the score line 52 separating the pair of stretches to define a pair of triangular oblique pleat first portions. The second portion for each of the two oblique pleats associated with pleat 16 comprises the area of the respective stretch 17 overlain by the respective first portion when the portion 52a is tucked under between the pair of stretches.

In construction a rectangular sheet of filter paper 10 is scored as illustrated in FIG. 2 or FIG. 4. The paper is then folded along the score lines 18 or 52 and gathered to form a series of transverse parallel pleats. In the embodiment of FIGS. 1 and 2, with the paper in this configuration folding occurs along score lines 22 to produce series of upper and lower flaps 64 and 66, as best seen in the broken-away view of FIG. 1, all of which are bent to point in the same direction in a nested configuration. (In the embodiment of FIGS. 4 and 5, the taper is from top-to-bottom, rather than from both toward the center, with fold lines 54 facing upward in the folded element 10 (FIG. 5) and the main fold lines 52 being tucked under within the folds, as indicated at 52a.)

The paper 10 is then formed into a ringlike configuration, with the first pleat attached to the last pleat, and placed into the mold as shown in FIG. 3. Rotation of bolts 38 and 40 causes the raising of ring members 44 and 46 and consequently compression of the peripheral regions of the filter paper 10 between the bearing portions 34 and 36 of compressing elements 28 and 30. An elastomer 68 is disposed within the outer and inner extensions 48 and 50, respectively, of the element 30. The compression of the paper end regions of the filter paper 10 forms an effective barrier to prevent seepage of the elastomer 68 into the main body of the filter paper 10 and serves to accentuate the taper produced by the additional pleats. The entire mold may then by placed in a curing oven (not shown) and the elastomer 68 and resin-impregnated filter paper 10 cured simultaneously. The compressing element 30 is perforated in its bottom portion 70 to permit uniform heat distribution. As shown in FIG. 3, the molding device compresses the paper 10 in the peripheral portions so as to produce an axis in those portions which is not aligned with the axis of the pleat as a whole.

Other embodiments will occur to those skilled in the art and are within the following claims.

What is claimed is:

1. A fluid filter comprising a pleated filtering medium arranged in an annulus and having axial main pleats defined by radial score lines and comprising a pair of stretches of said medium;

oblique secondary pleats at each radial periphery of said annulus defined in part by score lines oblique to said radial score lines, each said oblique pleat comprising first portions of said pair of stretches and a triangular flap comprising second portions of said pair of stretches with said oblique score lines being respectively between said first and second portions and extending between a point on a said radial score line spaced inward of said periphery and a point on said periphery intermediate said radial score line and an adjacent said radial score line, said oblique score lines intersecting in an angle of 60°; and the flaps of said obliqued pleats being bent to point the same direction about each said periphery in a nested configuration, whereby said filter tapers at said oblique pleats from top and bottom to an axial dimension less than the corresponding axial dimension of said main pleats;

the axis of a cross section of any portion of each said periphery being oblique to the longitudinal axis of the said main pleat closest to the plane of said cross section; and a seal disposed around each said periphery comprising a cured elastomer which at least partially overlaps said oblique pleats.

* * * * *